United States Patent
Madden et al.

Patent Number: 6,124,864
Date of Patent: Sep. 26, 2000

[54] ADAPTIVE MODELING AND SEGMENTATION OF VISUAL IMAGE STREAMS

[75] Inventors: Paul B. Madden, Acton; Philip R. Moorby, Boxford; John S. Robotham, Belmont; Jean-Pierre Schott, Weston, all of Mass.

[73] Assignee: SynaPix, Inc., Lowell, Mass.

[21] Appl. No.: 08/948,721

[22] Filed: Oct. 10, 1997

Related U.S. Application Data

[60] Provisional application No. 60/043,075, Apr. 7, 1997.

[51] Int. Cl.[7] .................................................. G06T 15/00
[52] U.S. Cl. ........................ 345/473; 345/420; 345/435; 382/100; 382/154; 382/284; 382/285
[58] Field of Search ..................................... 345/473, 420, 345/435; 382/284, 285, 100, 154

[56] References Cited

U.S. PATENT DOCUMENTS

| | | | |
|---|---|---|---|
| 3,947,833 | 3/1976 | Eckstein, Jr. | 340/258 R |
| 3,970,841 | 7/1976 | Green | 250/201 |

(List continued on next page.)

FOREIGN PATENT DOCUMENTS

| | | |
|---|---|---|
| 0794516A2 | 3/1997 | European Pat. Off. |
| 93/07554 | 4/1993 | WIPO |
| 93/21636 | 10/1993 | WIPO |
| 96/31047 | 10/1996 | WIPO |
| 96/31979 | 10/1996 | WIPO |
| 97/03416 | 1/1997 | WIPO |

OTHER PUBLICATIONS

Thalmann, N.M., and Thalmann, D., "Virtual Actors Living in a Real World," *IEEE*, pp. 19–29, (1995).

Blondé, L., et al., "A Virtual Studio for Live Broadcasting: The Mona Lisa Project," *IEEE MultiMedia*, pp. 18–28, (Summer 1996).

Hayashi, M., "Image Compositing Based on Virtual Cameras," *IEEE MultiMedia*, pp. 36–48, (Jan.–Mar. 1998).

Mallem, M., et al., "Creation and animation of computer–generated images combined with a camera and smart graphics card," *Butterworth–Heinemann Ltd*, 15(No. 8):427–433, (Oct. 1991).

(List continued on next page.)

*Primary Examiner*—Mark K. Zimmerman
*Assistant Examiner*—Kimbinh T. Nguyen
*Attorney, Agent, or Firm*—Hamilton, Brook, Smith & Reynolds, PC

[57] ABSTRACT

A technique for converging upon a computer-based model of a real world or synthetic scene. The computer model makes use of abstraction-based data objects as well as image-based data objects. A correlation mesh provides links between related image-based and abstraction-based objects. An initial step in a process analyzes an input image stream and user inputs to derive initial image-based objects and abstraction-based objects for the scene model. Subsequent steps in the process allow user inputs to refine the image-based objects, abstraction-based objects and/or the correlation mesh. As a result, refinements to the image-based object model of the scene can improve the abstraction-based model of the scene, and refinements to the abstraction-based object model can improve the image-based model.

43 Claims, 9 Drawing Sheets

U.S. PATENT DOCUMENTS

| | | | |
|---|---|---|---|
| 4,175,860 | 11/1979 | Bacus | 356/39 |
| 4,385,322 | 5/1983 | Hubach et al. | 358/221 |
| 4,620,318 | 10/1986 | Hill | 382/2 |
| 4,639,768 | 1/1987 | Ueno et al. | 358/22 |
| 4,646,229 | 2/1987 | Boyle | 364/200 |
| 4,661,986 | 4/1987 | Adelson | 382/41 |
| 4,667,221 | 5/1987 | Cawley et al. | 358/22 |
| 4,682,300 | 7/1987 | Seto et al. | 364/571 |
| 4,685,146 | 8/1987 | Fenster et al. | 382/54 |
| 4,692,806 | 9/1987 | Anderson et al. | 358/209 |
| 4,703,514 | 10/1987 | van der Wal | 382/41 |
| 4,706,296 | 11/1987 | Pedotti et al. | 382/42 |
| 4,835,532 | 5/1989 | Fant | 340/728 |
| 4,847,688 | 7/1989 | Nishimura et al. | 358/125 |
| 4,849,746 | 7/1989 | Dubner | 340/728 |
| 4,858,000 | 8/1989 | Lu | 358/84 |
| 4,864,394 | 9/1989 | Gillard | 358/105 |
| 4,870,692 | 9/1989 | Zuiderveld et al. | 382/6 |
| 5,058,042 | 10/1991 | Hanna et al. | 364/522 |
| 5,063,603 | 11/1991 | Burt | 382/37 |
| 5,067,014 | 11/1991 | Bergen et al. | 358/105 |
| 5,133,070 | 7/1992 | Barker et al. | 395/650 |
| 5,134,473 | 7/1992 | Nagura | 358/109 |
| 5,140,416 | 8/1992 | Tinkler | 358/88 |
| 5,210,799 | 5/1993 | Rao | 382/22 |
| 5,212,544 | 5/1993 | Kellar et al. | 358/22 |
| 5,259,040 | 11/1993 | Hanna | 382/41 |
| 5,260,791 | 11/1993 | Lubin | 358/160 |
| 5,270,756 | 12/1993 | Busenburg | 358/109 |
| 5,296,926 | 3/1994 | Nagura | 348/144 |
| 5,307,456 | 4/1994 | MacKay | 395/154 |
| 5,325,449 | 6/1994 | Burt et al. | 382/56 |
| 5,355,450 | 10/1994 | Garmon et al. | 395/162 |
| 5,414,806 | 5/1995 | Richards | 395/135 |
| 5,455,775 | 10/1995 | Huber et al. | 364/488 |
| 5,473,364 | 12/1995 | Burt | 348/47 |
| 5,479,597 | 12/1995 | Fellous | 345/435 |
| 5,488,674 | 1/1996 | Burt et al. | 382/284 |
| 5,511,153 | 4/1996 | Azarbayejani et al. | 395/119 |
| 5,577,190 | 11/1996 | Peters | 395/501 |
| 5,588,104 | 12/1996 | Lanier et al. | 395/326 |
| 5,588,139 | 12/1996 | Lanier et al. | 395/500 |
| 5,596,687 | 1/1997 | Peters, Jr. | 395/130 |
| 5,619,628 | 4/1997 | Fujita et al. | 395/127 |
| 5,696,892 | 12/1997 | Redman et al. | 345/473 |
| 5,748,199 | 5/1998 | Palm | 345/473 |

OTHER PUBLICATIONS

Gagalowicz, A., "Collaboration Between Computer Graphics and Computer Vision," *Proceedings of the Third International Conference on Computer Vision*, Osaka, Japan, pp. 733–737 (Dec. 4–7, 1990).

Menon, J., "Collaborative Visualization and Modeling," *Proceedings of the 1997 International Conference on Shape Modeling and Applications*, Aizu–Wakamatsu, Japan, pp. 178–187 (Mar. 3–6, 1997).

Berthold, K.P.H., et al. "Determining Optical Flow," *Artificial Intelligence*, 17:185–203, (1981).

Brooks, R.A., et al. "Geometric Modeling in Vision for Manufacturing," *SPIE*, 281:141–159, (1981).

Fua, P., "Model–Based Optimization: An Approach to Fast, Accurate, and Consistent Site Modeling from Imagery," *Artificial Intelligence Center—SRI International*.

Fua, P., et al. "Using 3–Dimensional Meshes to Combine Image–Based and Geometry–Based Constraints," *SRI International*.

Tomasi, C., et al., "Shape and Motion from Image Streams: a Factorization Method—Planar Motion," *Carnegie Mellon School of Computer Science*, (Sep. 1990).

Tomasi, C., et al., "Shape and Motion from Image Streams: a Factorization Method—Point Features in 3D Motion," *Carnegie Mellon School of Computer Science*, (Jan. 1991).

Tomasi, C., "Shape and Motion from Image Streams: a Factorization Method," *Carnegie Mellon School of Computer Science*, (Sep. 1991).

Little, T.D.C., et al., "Interval–Based Conceptual Models for Time–Dependent Multimedia Data," *Boston University Multimedia Communications Laboratory and Purdue University School of Electrical Engineering Multimedia Communications Lab*, (May 1993).

Schechter, G., et al., "Functional 3D Graphics in C++—with an Object–Oriented, Multiple Dispatching Implementation," *Eurographics Object–Oriented Graphics Workshop*, (1994).

Elliott, C., "The Essence of ActiveX Animation," *Microsoft Research*, (Feb. 1997).

Elliott, C., "A Brief Introduction to Active VRML," *Microsoft Research Technical Report*, (Feb. 1996).

Maestri, G., "Parametric, Object–Oriented Modeling and Animation with Houdini," pp. 48–50, *Digital Magic*, (Aug. 1997).

Drazovich, R.J., et al., "Radar Target Classification," pp. 496–501, *IEEE*, (Aug. 1981).

Levine, M.D. et al., "A Knowledge–Based Computer Vision System," pp. 335–352, *Computer Vision Systems*, (1978).

State, A. et al., "Superior Augmented Reality Registration by Integrating Landmark and Magnetic Tracking," pp. 429–438, *Computer Graphics Proceedings, Annual Conference Series*, (1996).

"Middlesex Virtual Set System," Product Brochure, (1997).

"Cyberset O Highland Virtual Set," *Product Orad High–Tec Systems*, (1997).

"Virtual Replay Sports Analysis Tool," Product Brochure, (1997).

"Jaleo Digital Post Production System," Product Brochure, (1997).

"Flint and Flint RT," Product Brochure, (Mar. 1997).

"Warner Digital Creates Glacial Gales," *American Cinematographer*, pp. 38–39, (Jul. 1997).

"Digiscore Saves the Day," Product Flyer, (1996).

"Inferno," http://www.discreet.com, (1997).

"Flame," Product Description, http://www.discreet.com, (1997).

"Composer V4," Alias Wave Front Product Description, (1995).

"Power Animator," Alias/Wavefront Product Brochure, (1996).

"SoftImage 3D 3.51 for Windows," Product Review, (1995).

"3D Studio Max," Product Review, (1997).

"Animation Master," Product Demonstration, (1997).

Clarkson, M.,"3D Animation Tools for Less Than $1,500," *PC Graphics and Video*, pp. 52–56, (Aug. 1996).

Hamlin, J.S., "Autodessys' 3D Modeler FormZ Renderzone 2.8," *PC Graphics and Video*, pp. 58–62, (Aug. 1996).

Street, R., "3–D Software for the Newcomer," *A V Video*, pp. 62–67, (Jul. 1996).

Sowizral, H., et al., "Java 3D API Specification," (Aug. 1997).

Tenenbaum, J.M., et al., "IGS: A Paradigm for Integrating Image Segmentation and Interpretation," *Artificial Intelligence Center—Stanford Research Institute*, pp. 504–513.

Binford, T.O., et al., "Image Understanding Via Geometric Models," pp. 364–369, *IEEE*, (1980).

Price, K.E., et al., "Symbolic Matching of Images and Scene Models," pp. 105–112, *IEEE*, (1982).

Amini, A.A., et al., "Representation and Organization of Domain Knowledge in a Blackboard Architecture: A Case Study from Computer Vision," pp. 884–889, *IEEE*, (1987).

Feldman, J.A., et al., "Decision Theory and Artificial Intelligence—A Semantics–Based Region Analyzer," *Artificial Intelligence*, 5:349–371, (1974).

Barrow, H.G., et al., "Representation and Use of Knowledge in Vision," *Stanford Research Institute*.

Nevatia, R., et al., "Description and Recognition of Curved Objects," *Artificial intelligence*, 8:77–98, (1977).

Parma, C.C., et al., "Experiments in Schema–Driven Interpretation of a Natural Scene," pp. 237–245, *IEEE* (1980).

Hanson, A.R., et al., "Constructing Semantic Models in the Visual Analysis of Scenes," *The Milwaukee Symposium on Automatic Computation and Control*, pp. 97–102.

Shaheen, S.I., et al., "Some Experiments with the Interpretation Strategy of a Modular Computer Vision System," *Pattern Recognition*, 14(1–6): 87–100, (1981).

Levine, M.D., et al., "A Modular Computer Vision System for Picture Segmentation and Interpretation," *IEEE Transactions on Pattern Analysis and Machine Intelligence*, PAMI–3(5) :540–556, (Sep. 1981).

Levine, M.D., et al., "A Modular Computer Vision System for Picture Segmentation and Interpretation," pp. 522–539, *IEEE*, (1979).

"Nonlinear Video Reigns at NAB," *NewMedia*, pp. 21–29, (Jun. 1996).

Beale, S., "Media Components Come Together," www.macworld.com, pp. 56–57, (Nov. 1996).

Ballard, D.H., et al., "An Approach to Knowledge–Directed Image Analysis," *Computer Vision Systems*, (1978).

Burt, P.J. et al., "The Laplacian Pyramid as a Compact Image Code," *IEEE Transactions on Communications*, COM–31(4) :532–540, (Apr. 1983).

Williams, T.W. et al., "Model–Building in The Visions System," *Massachusetts Institute of Technology $5^{th}$ International Joint Conference on Artificial Intelligence*, 2:644–645, (Aug. 1977).

Jancene, P. et al., "RES: Computing the Interactions Between Real and Virtual Objects in Video Sequences."

Rohrer, R., "Automated Construction of Virtual Worlds Using Modeling Constraints," *The George Washington University—Progress Report*, (Jan. 1994).

Debevec, P.E., et al. "Modeling and Rendering Architecture from Photographs: A Hybrid Geometry–and Image–Based Approach," *Computer Graphics Proceedings, Annual Conference Series*, 11–20, (1996).

Debevec, P.E., et al. "Recovering High Dynamic Range Radiance Maps from Photographs," *Computer Graphics Proceedings, Annual Conference Series*, 369–378, (1997).

Alzarbayejani, A., et al. "Recursive Estimation of Motion, Structure, and Focal Length," *IEEE Transactions on Pattern Analysis and Machine Intelligence*, 17(6) :562–575, (Jun. 1995).

Poelman, C.J., "The Paraperspective and Projective Factorization Methods for Recovering Shape and Motion," *Carnegie Mellon School of Computer Science*, (Jul. 1995).

Becker, S., et al., "Semiautomatic 3–D Model Extraction From Uncalibrated 2–D Camera Views," *MIT Media Laboratory*.

Sawhney, H.S., "3D Geometry From Planar Parallax," *Machine Vision Group—IBM Almaden Research Center*, (1994).

SCENE MODEL          40

SPATIAL REFERENCE    41
    VISUAL COORDINATE SYSTEM          41-1
    ABSTRACT COORDINATE SYSTEM        41-2

OBJECT LIST          43
    IMAGE-BASED OBJECT 1              50-1
    IMAGE-BASED OBJECT 2              50-2
    IMAGE-BASED OBJECT h              50-h
        IMAGE-BASED OBJECT h-1        (REGION 1)   } 50
        ⋮
        IMAGE-BASED OBJECT h-j        (REGION j)
    ⋮
    IMAGE-BASED OBJECT 1              50-i

ABSTRACTION-BASED OBJECT 1        60-1
    ABSTRACTION-BASED OBJECT 2        60-2
    ABSTRACTION-BASED OBJECT h        (PERSON) 60-h
        ABSTRACTION-BASED OBJECT h-1 (ARMS)    } 60
        ABSTRACTION-BASED OBJECT h-2 (HEAD)
        ABSTRACTION-BASED OBJECT h-3 (LEGS)
        ABSTRACTION-BASED OBJECT h-4 (TORSO)
    ⋮
    ABSTRACTION-BASED OBJECT          60-j

LIGHT OBJECT          ⋯ 74
    CAMERA OBJECT         ⋯ 75
    VIEWING OBJECT        ⋯ 76    } 70
    PATH OBJECT           ⋯ 77
    OPERATION OBJECT      ⋯ 78
    PROXY OBJECT          ⋯ 79

CORRELATION MESH
    IMAGE-BASED OBJECT u: ABSTRACTION-BASED OBJECT v   80-1
    IMAGE-BASED OBJECT w: ABSTRACTION-BASED OBJECT x   80-2   } 80
    ⋮
    IMAGE-BASED OBJECT y: ABSTRACTION-BASED OBJECT z   80-c

*Figure 3*

```
IMAGE STREAM_1                  51
    SCENE_id                    51-1
    TAKE                        51-1
    IMAGE TYPE                  51-3
    FRAME_RATE                  51-4
    #_FRAMES                    51-5
    SENSOR_DATA                 51-6
    IMAGE_FRAME_1               51-7-1
    POSE_FRAME_1                51-8-1
    IMAGE_FRAME_2               51-7-2
    POSE_FRAME_2                51-8-2
         .                          .
         .                          .
    IMAGE_FRAME n               51-7-n
    POSE_FRAME n                51-8-n
    ANNOTATIONS                 51-9

FILTERED_IMAGE_STREAM           52
    IMAGE_STREAM_id             52-1
    FILTERED_FRAME_1            52-2-1
    FILTERED_FRAME_2            52-2-2

FILTERED_FRAME_n            52-2-n
    ANNOTATIONS                 52-3

FEATURE_1                       53
    IMAGE STREAM_id             53-1
    FILTERED_FRAME_id           53-2
    BOURDING_RECTANGLE          53-3
    PIXEL_MAP                   53-4
    ANNOTATIONS                 53-5

PATH MODEL                      54
    IMAGE_STREAM_id             54-1
    FEATURE_1                   54-2-1
         .                          .
    FEATURE_k                   54-2-k
    ANNOTATIONS                 54-3
```

*Figure 4A*

| | |
|---|---|
| PATTERN_MATCH_1 | 55 |
|     FEATURE_x | 55-1 |
|     FEATURE_y | 55-2 |
|     ANNOTATIONS | 55-3 |
| | |
| SEGMENT_1 | 56 |
|     IMAGE_STREAM_id | 56-1 |
|     FILTERED_FRAME_id | 56-2 |
|     SEGMENT_DEFIMTION | 56-3 |
|     ANNOTATIONS | 56-4 |
| | |
| IMAGE_TRACKING | 57 |
|     IMAGE_STREAM_id | 57-1 |
|     SEGMENT_1 | 57-2-1 |
| | |
|     SEGMENT_l | 57-2-l |
|     ANNOTATIONS | 57-3 |
| | |
| IMAGE_ | 58 |
|     IMAGE_STREAM_id | 58-1 |
|     SEGMENT_1 | 58-2-1 |
|     VECTOR_1 | 58-3-1 |
|     SEGMENT_2 | 58-2-2 |
|     VECTOR_2 | 58-3-2 |
| | |
|     SEGMENT_m | 58-2-m |
|     VECTOR_m | 58-3-m |

ABSTRACTION_BASED OBJECT_1          61
    GEOMETRIC SURFACE EQUATIONS     61-1
    VOLUMETRIC POLYGONAL MESH/NORMALS  61-2
    SHADING                         61-3
    TEXTURING                       61-4
    GRID ELEMENTS                   61-5
    LEVEL OF DETAIL                 61-6
    RIGID/AMORPHOUS                 61-7
    ANNOTATIONS                     61-8

PROXY OBJECT                        62
    ABSTRACTION_BASED_OBJECT_id     62-1
    PROXY REFERENCE                 62-2
    ANNOTATIONS                     62-3

ABSTRACT OPERATION                  63

Figure 5

| | | | |
|---|---|---|---|
| LIGHT_OBJECT_1 | 74 | | |
|     POSITION | 74-1 | | |
|     DIRECTION | 74-2 | | |
|     COLOR | 74-3 | | |
|     STRENGTH | 74-4 | | |
| | | | |
| CAMERA_OBJECT_ | 75 | | |
|     POSITION | 75-1 | OPTICAL_CENTER | 75-5 |
|     DIRECTION | 75-2 | VERTICAL_res | 75-6 |
|     FIELD_OF_VIEW | 75-3 | HORIZONTAL_res | 75-7 |
|     FOCAL_LENGTH | 75-4 | RADIAL DEFORMATION | 75-8 |
| | | CCD ARRAY DIST. | 75-9 |
| | | | |
| VIEWING_OBJECT_1 | 76 | | |
|     POSITION | 76-1 | | |
|     DIRECTION | 76-2 | | |
|     CLIPPING PLANES | 76-3 | | |
| | | | |
| PATH OBJECT | 77 | | |
|     OBJECT REFERENCE | 77-1 | | |
|     PATH TYPE | 77-2 | | |
|         GEOMETRIC | 77-2-1 | | |
|             MOTION | | | |
|             VELOCITY | | | |
|         PHYSICAL | 77-2-2 | | |
|             ELASTICITY | | | |
|             HARDNESS | | | |
|             ROUGHNESS | | | |
|             FORCE FIELD | | | |
|         PIXEL REGION | 77-2-3 | | |
|             INTERPOLATED POINT LIST | | | |
|         CAMERA MOTION | 77-2-4 | | |
|             INTERPOLATED POINT LIST | | | |

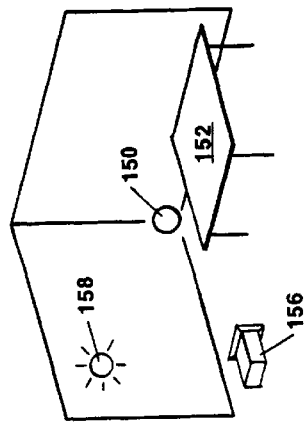

ABSTRACTION-BASED MODEL 60

OBJECT 1: SPHERE POSITION, SIZE, COLOR
OBJECT 2: TABLE TOP POSITION, SIZE, TEXTURE, CORNER POSITION
0.AMENA 1: POSITION, ORIENTATION, FOCAL LENGTH
LIGHT 1: POSITION, INTENSITY, TYPE

OBJECT 2: TABLE
TABLE TOP
LEG 1
LEG 2
LEG 3
LEG 4

OBJECT 3: PATH MODEL

OBJECT 4: IMAGE_DERIVED PATH

CORRELATION MESH 100

F1/REGION 1: OBJECT 2
F2/REGION 3: OBJECT 1
(FIRST PASS)

F1/REGION 5: OBJECT 2/LEG 1
F1/REGION 6: OBJECT 2/LEG 2
.....
(SECOND PASS)

TRACK 1 OBJECT 3
.....

TRACK 1: OBJECT 4
.....
(FOURTH PASS)

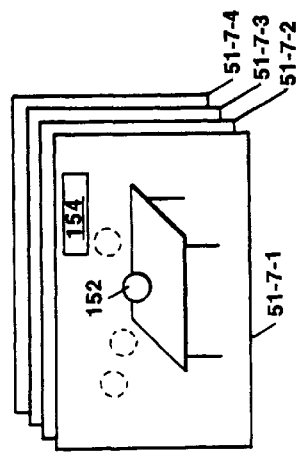

IMAGE-BASED MODEL 50

F1: REGION 1:    PIXEL MAP_1 (TABLE TOP)
    REGION 2:    PIXEL MAP_2 (PICTURE)
    REGION 3:    PIXEL MAP_3 (SOCCOR BALL)
    ANNOTATIONS

F2: REGION n+1
    REGION n+2
    REGION n+3

F3: ..
F4: ..

F1: REGION 5
    REGION 6

TRACK 1: F1: REGION 3
         F2: REGION n+3
         F3: REGION 2n+3
         F4: REGION 3n+3

ADAPTIVE MODELING AND SEGMENTATION OF VISUAL IMAGE STREAMS

CROSS REFERENCE TO RELATED APPLICATION

This application claims the benefit of a U.S. Provisional Application Ser. No. 60/043,075 filed Apr. 7, 1997.

BACKGROUND OF THE INVENTION

The processing of images via a computer-based or similar electronic system, called digital image processing, is increasingly applied to a wide range of applications, including motion picture production, television productions, multimedia presentations, architectural design, and manufacturing automation. Each of these applications uses digital image processing to some degree in creating or rendering a computer model of a scene in the real world. The model not only describes physical objects such as buildings, parts, props, backgrounds, actors, and other objects in a scene accurately, but also represents relationships between objects such as their movement and other transformations over time.

There are presently two general categories of techniques for creating computer models of a scene. In the first, which is essentially image-based, the computer accepts a visual image stream such as produced by a motion picture, film or video camera. The image stream is first converted into digital information in the form of pixels. The computer then operates on the pixels in certain ways by grouping them together, comparing them with stored patterns, and other more sophisticated processes to determine information about the scene. So-called "machine vision" or "image understanding" techniques are then used to extract and interpret features of the actual physical scene as represented by the captured images. Computerized abstract models of the scene are then created and manipulated using this information.

For example, Becker, S. and Bove, V. M., in "Semiautomatic 3D Model Extraction from Uncalibrated 2D Camera Views," *Proceedings SPIE Visual Data Exploration and Analysis II*, vol. 2410, pp. 447–461 (1995) describe a technique for extracting a three-dimensional (3D) scene model from two-dimensional (2D) pixel-based image representations as a set of 3D mathematical abstract representations of visual objects in the scene as well as cameras and texture maps.

Horn, B. K. P. and Schunck, B. G., in "Determining Optical Flow," *Artificial Intelligence*, Vol. 17, pp. *185–203* (1981) describe how so-called optical flow techniques may be used to detect velocities of brightness patterns in an image stream to segment the image frames into pixel regions corresponding to particular visual objects.

Finally, Burt, P. J. and Adelson, E. H., in "The Laplacian Pyramid as a Compact Image Code," *IEEE Transactions on Communications*, Vol. COM-31, No. 4, pp. 532–540 (1983) describe a technique for encoding a sampled image as a "pyramid" in which successive levels of the pyramid provide a successively more detailed representation of the image.

In a second approach to developing a scene model, which is essentially abstraction-based, the computer model is built from geometric, volumetric, or other mathematical representations of the physical objects. These types of models are commonly found in architectural, computer-aided design (CAD), and other types of computer graphics systems, as generally described in Rohrer, R., "Automated Construction of Virtual Worlds Using Modeling Constraints," The George Washington University (January 1994), and Ballard, D., et al., "An Approach to Knowledge-Directed Image Analysis," in *Computer Vision Systems* (Academic Press, 1978) pp. 271–281.

The goal in using either type of scene model is to create as accurate a representation of the scene as possible. For example, consider a motion picture environment where computer-generated special effects are to appear in a scene with real world objects and actors. The producer may choose to start by creating a model from digitized motion picture film using automatic image-interpretation techniques and then proceed to combine computer-generated abstract elements with the elements derived from image-interpretation in a visually and aesthetically pleasing way.

Problems can occur with this approach, however, since automatic image-interpretation processes are statistical in nature, and the input image pixels are themselves the results of a sampling and filtering process. Consider that images are sampled from two-dimensional (2D) projections (onto a camera's imaging plane) of three-dimensional (3D) physical scenes. Not only does this sampling process introduce errors, but also the projection into the 2D image plane of the camera limits the amount of 3D information that can be recovered from these images. The 3D characteristics of objects in the scene, 3D movement of objects, and 3D camera movements can typically only be partially estimated from sequences of images provided by cameras.

As a result, image-interpretation processes do not always automatically converge to the correct solution. For example, even though one might think it is relatively straight forward to derive a 3D mathematical representation of a simple object such as a soda can from sequences of images of that soda can, a process for determining the location and size of a 3D cylinder needed to represent the soda can may not properly converge, depending upon the lighting, camera angles, and so on used in the original image capture. Because of the probabilistic nature of this type of model, the end result cannot be guaranteed.

Abstraction-based models also have their limitations. While they provide a deterministic and thus predictable representation of a scene, they assume that the representation and input parameters are exactly correct. The result therefore does not always represent the real scene accurately.

For example, although an object such as a soda can might be initially modeled as a 3D cylinder, other attributes of the scene, such as lights, may not be precisely placed or described in the model. Such impreciseness reveals itself when an attempt is made to use the abstraction-based model to create a shaded rendition of the soda can. In addition, the object in the actual scene may not be physically perfect, i.e., what was thought to be a perfectly cylindrical soda can may in fact be deformed in some way. Subtle curvatures, scratches, and dents may all be missing from the model of the soda can. The actual detailed geometry of the soda can's lid and pull tab may also be oversimplified or completely missing in the model.

It is therefore difficult to precisely assign mathematical or other abstract object descriptions to every attribute of a scene manually.

It is also very difficult to completely distinguish arbitrary physical objects and their attributes, along with camera parameters, solely from the pixel values of captured images.

SUMMARY OF THE INVENTION

The invention is a technique for converging upon a scene model using an adaptive strategy that combines abstraction-based models derived from mathematical abstractions, image-based models derived from visual image streams, and user inputs. The information from an abstraction-based model of the scene is used to improve the accuracy and efficiency of image-based techniques applied to the scene. Similarly, image-based techniques are used to provide corrections and updates to the abstraction-based model. The convergence of either approach is controlled by a human user who guides the creation of an initial model, the choice and use of image-based analysis techniques, the interpretation of image-based models, and/or the successive refinements of abstraction-based models.

Now more particularly, in a preferred embodiment, a scene model is developed which contains information stored as data objects in an object-oriented database. A first class of objects, called image-based objects, is derived from machine-vision analysis of one or more visual image streams. A second class of objects, called abstraction-based objects, contains abstract geometric, volumetric, or other mathematical models of physical objects in the scene.

Annotations are added to the scene model to indicate a linkage or correlation to form a "correlation mesh" between the abstraction-based objects and the image-based objects. As links are added to the correlation mesh, the relationships between the two types of models are better defined, thereby allowing the scene model to converge accurately and predictably.

In a first example of a software process according to the invention, an input visual image stream is first analyzed into one or more pixel representations. Each pixel representation is then preferably stored as an image-based object including a set of pixels taken from one of the images in the stream. The human operator may then examine the pixel regions and select an abstraction-based object from a predefined object model database that represents a physical object depicted in the pixel region. The operator then creates a link between the stored pixel data in the image-based object and the abstraction-based object in the correlation mesh.

For example, in a scene containing a soccer ball that bounces off of a table, the user may recognize that one of the pixel regions in an image-based object contains the soccer ball, and therefore an equation for a "sphere" is added to the scene model as an abstraction-based object. The user then specifies a refinement to the scene model as an entry in the correlation mesh which "links" the image-based object containing the pixel representations having the soccer ball in them to the mathematical representation of a sphere in the abstraction-based object.

Machine vision algorithms may also be used to automate the process of annotating the correlation mesh. For example, an annotation may be added to the correlation mesh as a result of running a pattern recognition algorithm on an input image stream. The pattern recognition algorithm may, for example, determine that a pixel region of a table top is of a type called a "rectangle," and then add a mathematical description of the rectangle as an abstraction-based object to the scene model, as well as an appropriate entry in the correlation mesh.

The abstraction-based objects in the model may be refined as a result of further image analysis and user input. For example, after looking at the pixel regions representing the table, the user may notice that the sides of the table top are actually "bowed" and are not "mathematically perfect" as specified in an abstraction-based rectangular object for the table top. Therefore, the user may refine the abstraction-based representation of the table to include another abstraction-based object containing a mathematical approximation for the "bowed" table top as a level of detail refinement to the mathematically perfect rectangle.

This adaptive feedback with user intervention strategy therefore selectively increases the accuracy and detail of the abstraction-based objects in the scene model while also selectively increasing the density and information content of the image-based objects as well.

The invention is also a method for developing a scene model from one or more visual image streams wherein one or more pixel representations (pixels or pixel regions) are segmented from the image streams. The segmented pixel representations partially or completely represent one or more visual objects captured in the image streams. One or more partial or complete abstract models are also developed for the same visual objects. The next step of the method correlates one or more of the pixel representations with one or more of the abstract models of the same objects, creating a machine-readable correlation database of these correlations between individual pixel representations and certain selected features of the abstract models. An iterative refinement process step is used in development of the scene model to allow a human operator to successively make additions, deletions, changes and/or other modifications to either the pixel representations, the abstract models and/or the correlation database.

Synthetic objects and synthetic image streams rendered from these synthetic objects may be used in the segmenting step instead of (or in addition to) physical objects and their associated image streams.

The output of machine vision or other image analysis processes may also be used to partially or completely automate the generation of abstract models from image streams either captured from physical objects and/or rendered from synthetic objects. The machine vision processes may also partially or completely automate the segmentation of individual pixels (or pixel regions) that represent one or more physical (or synthetic) objects in the input image streams.

A human operator may also access one or more of the abstract models from the correlation database, one or more of the pixel representations from the correlation database, one or more of the pixel representations from one or more of the corresponding abstract models through the links in the correlation database, and/or one or more of the abstract models from one or more of the corresponding pixel representations through the links in the correlation database. An acoustic model stores data concerning the acoustic properties of objects in the scene model, such as their acoustic absorption and reflection characteristics.

Specific hardware and/or software that accelerates the performance of one or more machine vision processes may be used to provide interactive responsiveness to the human operator during the iterative refinement process.

The correlation step of the process may also include in the correlation database one or more correlations between one or more individual image frames in one or more image streams and one or more corresponding abstract models of the positions, movements, orientations and/or other static or dynamic parameters of the (real or synthetic) camera that captured these image streams. In such an instance, the user may also access the abstract model of the camera from the corresponding image frames through the correlation database; and vice versa; and access the abstract models of the camera directly from the correlation database.

The correlation step may also include in the correlation database one or more correlations between one or more image frames in one or more image streams and one or more corresponding abstract models of the positions, movements, orientations and/or other static or dynamic parameters of the (real or synthetic) lighting used to illuminate these image streams. In this case, the user may also access the abstract model of the lighting from the corresponding image frames through the correlation database; and vice versa; and access the abstract models of the lighting directly from the correlation database.

A process for developing a scene model according to the invention also includes a step of creating and maintaining multiple versions of image streams and/or pixel representations (e.g. at different levels of image resolution, different levels of image detail, and/or different color space representations), allowing automatic and/or user-controlled determination of which version to use for generating a more interactive display of intermediate results from the iterative refinement process, while allowing automatic and/or user-controlled synchronization for applying the same set of operations and/or manipulations in the iterative refinement process to one or more corresponding versions either simultaneously or delayed in time. A process for developing a scene model according to the invention also includes a step of creating and maintaining multiple versions of abstract models. These multiple versions may be at different levels of detail in geometry, shading, structure, composition, surface texture, and the like, and are iteratively refined during the process.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views, wherein:

FIG. 3 illustrates exemplary data structures in the scene model more particularly;

FIGS. 4A and 4B illustrate exemplary image-based objects;

FIG. 5 illustrates exemplary abstraction-based objects;

FIG. 6 illustrates other scene model objects;

FIG. 8 is a more detailed view of the image-based objects, abstraction-based objects, and correlation mesh.

DETAILED DESCRIPTION OF PREFERRED EMBODIMENTS

Figure 1:
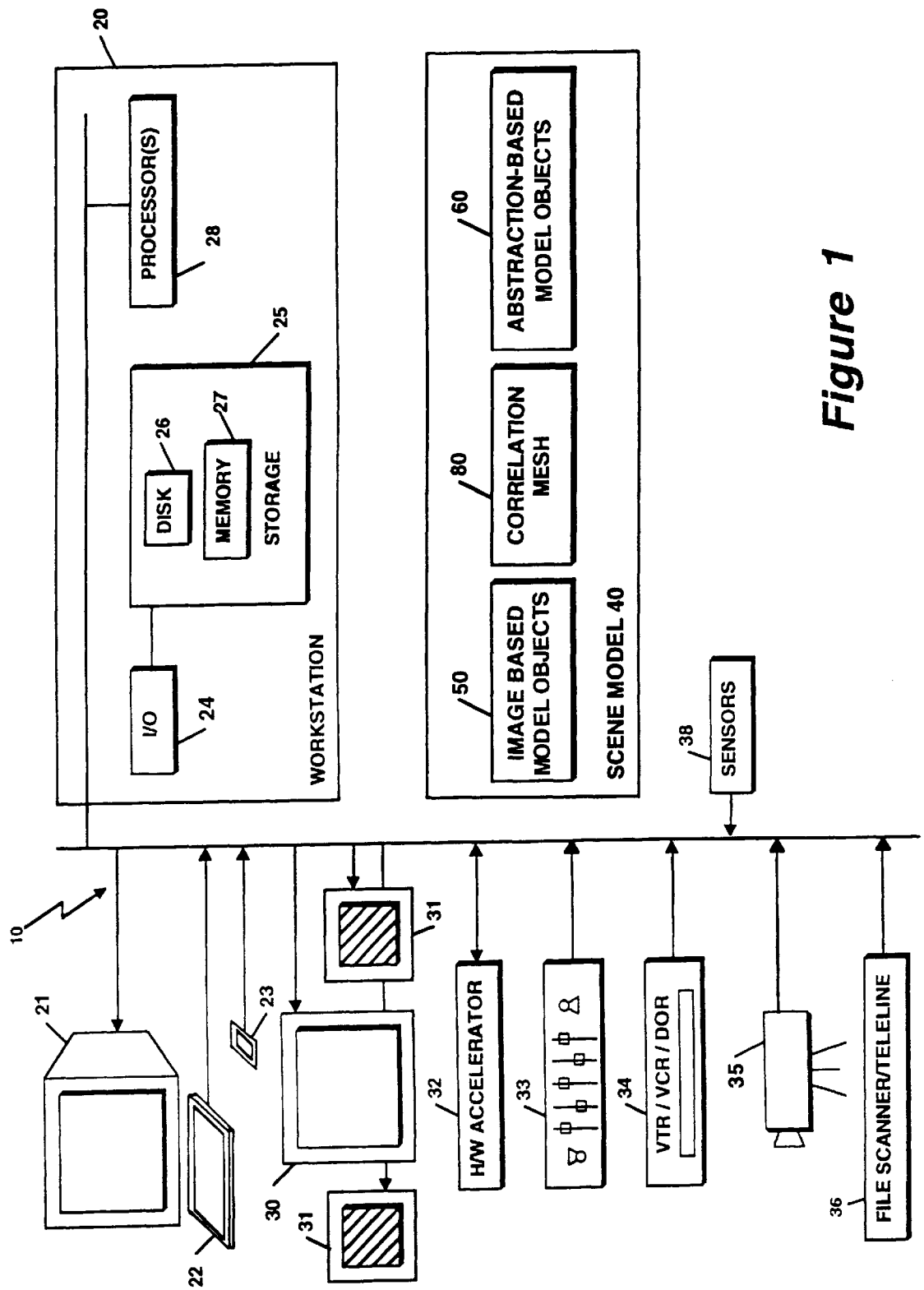
FIG. 1 is a block diagram of an image processing system which develops a scene model according to the invention.

Turning attention now in particular to the drawings, FIG. 1 is a block diagram of the components of a digital image processing system 10 according to the invention. The system 10 includes a computer workstation 20, a computer monitor 21, and input devices such as a keyboard 22 and mouse 23. The workstation 20 also includes input/output interfaces 24, storage 25, such as a disk 26 and random access memory 27, as well as one or more processors 28. The workstation 20 may be a computer graphics workstation such as the 02/Octane sold by Silicon Graphics, Inc., a Windows NT type-work station, or other suitable computer or computers. The computer monitor 21, keyboard 22, mouse 23, and other input devices are used to interact with various software elements of the system existing in the workstation 20 to cause programs to be run and data to be stored as described below.

The system 10 also includes a number of other hardware elements typical of an image processing system, such as a video monitor 30, audio monitors 31, hardware accelerator 32, and user input devices 33. Also included are image capture devices, such as a video cassette recorder (VCR), video tape recorder (VTR), and/or digital disk recorder 34 (DDR), cameras 35, and/or film scanner/telecine 36. Sensors 38 may also provide information about the scene and image capture devices.

The invention, in particular, is a scene model 40 and the processes used to develop the scene model 40. As shown in FIG. 1, the scene model 40 includes a set of image-based model objects 50, a set of abstraction-based model objects 60, and a correlation mesh 80.

Figure 2:
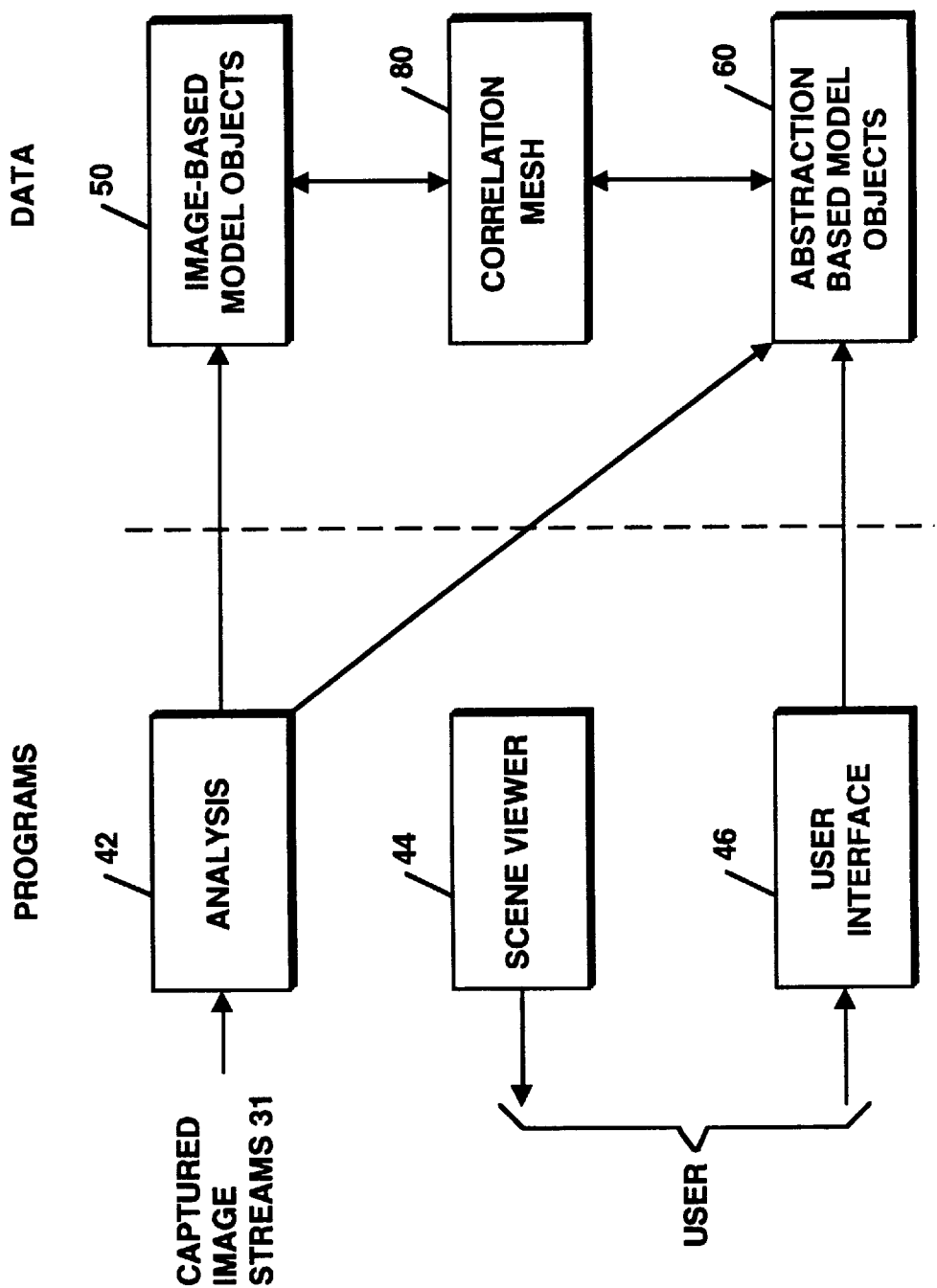
FIG. 2 illustrates various functional elements and data structures in the scene model.

As shown in greater detail in FIG. 2, the scene model 40 is created and modified by a software including an analysis function 42, a user interface 44, and a scene viewer 46. The analysis function 42 uses image processing algorithms, such as "machine vision" or "image understanding" algorithms, to extract and interpret information about the captured images 39. These features and/or characteristics of the physical scene, as detected and/or estimated from the captured image(s), then become the basis for generating image-based objects 50 that characterize the scene. The image-based objects 50 may contain information not only derived from the captured image sources themselves, such as VTR/VCR/DDR 34 (camera 35 and film scanner/telecine 36) but also that derived from other secondary sensors 38. In addition, image-based objects may be derived from synthetic image streams provided by external computer systems such as graphics systems and other computer modeling systems.

Abstraction-based objects 60 may be created in a number of different ways. In a first scenario, the results of the image analysis function 42 are encapsulated as one or more abstraction-based objects 60 that are an alternative analytic representation of the scene. In addition, abstraction-based objects may be created by presenting a user of the system 10 with a rendition of the scene via the scene viewer 44. The user then provides inputs through the user interface 46 to create abstraction-based objects 60.

FIG. 3 is a more detailed view of the data objects in the scene model 40. The scene model 40 is a mechanism for achieving a unified representation of a scene which supports both image-based model objects 50 and abstraction-based model objects 60. The scene model 40 creates a common context for working with all object types 50 and 60, to permit the user to create renditions of the scene using both object types, with a high degree of confidence that the end result will be satisfactory. During the operation of the invention, the scene model 40 evolves into a unified representation of the scene and its dynamics, including correlations between the image-based objects 50 and abstraction-based objects 60 modeled in the scene, as reflected in the correlation mesh 80.

An exemplary scene model object 40 includes a spatial reference model 41, a list of objects 43 in the scene, other scene-related data objects 70, and the correlation mesh 80.

The spatial reference model 41 typically defines a scene coordinate system 41-1 for the physical scene that occurs in the natural physical universe, such as determined by the analysis algorithms 42 or sensors 38, from which the visual image stream 39 was taken. The scene coordinate system 41-1 is then used as the basis for defining image-based objects 50, related abstraction-based objects 60 and actions thereon.

The spatial reference model 41 can also define an abstract coordinate system 41-2 for a synthetic scene such as originally created in a computer application such as a computer-aided design (CAD), computer graphics, or computer animation system. Visual stream(s) rendered from this synthetic scene can then be analyzed through image-based analysis techniques that are similar to those applied to streams 39 of actual captured images from physical scenes, as will be described shortly. This can be done when an initial scene model 40 is not available or accessible, and the scene model 40 must be first derived, in whole or part, by analyzing the visual image streams 39.

The spatial reference model 41 of each type includes a space definition such as a volume inside a regular parallelopiped. This is typically a three-dimensional space bounded on each side by a rectangle, with opposite rectangles of the same size and relative orientation. The coordinate system is typically the Cartesian (X,Y,Z) system, with coordinate grid being linear in all three dimensions. Bounding planes are typically used to define the top, bottom, far left, far right, front, and back of the spatial reference model 41, with the point (0,0,0) being the intersection of the front, bottom, and far left bounding planes.

The scene model 40 also includes a list 43 of image-based 50 and abstraction-based 60 objects in the scene. In its simplest form, the object list 43 may simply be a collection of image-based objects 50-1, 50-2, . . . , 50-$i$, and abstraction-based objects 60-1, 60-2, . . . , 60-$j$.

However, any object may also be defined as a hierarchical object structure, where one object is composed of various constituent sub-objects. For example, an image-based object 50-$h$ may consist of an image pyramid of a set of pixel regions 50-$h$-1, . . . 50-$h$-$j$. Likewise, an abstraction-based object 60-$h$ representing a person may have sub-objects 60-$h$-1, 60-$h$-2, . . . , 60-$h$-4 that represent the arms, legs, head, and torso of the person, respectively. These sub-objects may themselves be composed of other sub-objects.

A typical scene model 40 is also dynamic in the sense that it can include a set of abstract operations 78 that are applied to the objects in the list 43. These abstract operations 78 are typically used to specify changes and movements of objects over time in the scene model 40, and can be defined in whatever terms are appropriate to the scene model 40, such as mathematical or geometric transformations (e.g., motion paths, surface deformations), or procedural animations (e.g., software instructions that specify an object's "behavior" and/or modify the object's properties over time).

To further permit realistic renditions from the scene model 40, representations of other physical objects in the scene such as lighting objects 74, camera objects 75, and viewing objects 76 are also included. Lighting objects 74 represent sources of lighting on the set (or location); camera objects 75 represent cameras; and viewing objects 76 represent the point of view of an observer. Lighting objects 74 and camera objects 75 are defined as a type of abstract object 60, whether derived from image analysis or user inputs.

The correlation mesh 80 contains a list of links 80-1, 80-2, . . . , 80-$c$ between specific image-based objects 50 and abstraction-based objects 60. The development of the correlation mesh 80 for an exemplary scene is described in detail below in connection with FIG. 8.

Turning attention now to FIGS. 4A and 4B, various types of image-based objects 50 will be described. Each of the image-based objects 50 is derived from a corresponding analysis algorithm 42 operating on one or more real or synthetic input image streams 39.

A first type of image-based object 50 is an image stream object 51. Image stream objects 51 generally represent a sequence of frames of digitized samples, where each sample corresponds to a specific pixel sample value (picture element) from an input image stream 39. A pixel's physical or synthetic sample value represents the detected amount of spectral energy projected onto the corresponding region of a sensor during the specific sampling (or exposure) interval.

An exemplary image stream object 51 is a linear sequence of images of a single scene, captured from a single camera 35 (or other imaging source 34, 36) over a specified period of time. Image stream objects 51 can also be created by rendering a sequence of images from a synthetic model visual scene such as represented in a computer model design system.

The image stream object 51 is given a label, address, or other identity such as "IMAGE_STREAM_1" to uniquely identify it. The image stream object 51 also includes a number of data fields or records, including a scene identification 51-1, a take identification 51-2, an image type identifier 51-3, a frame rate 51-4, a number of frames 51-5, sensor data 51-6, a set of image frames 51-7-1, 1, 51-7-2, . . . 51-7-$n$, a set of poses 51-8-1, 51-8-2, . . . , 51-8-$n$, and annotations 51-9.

The scene identification data 51-1 contains information relating the image stream 51 to a particular scene. This is of particular use given that there can be multiple image stream representations 51 of the same physical (or synthetic) scene.

Individual image streams 51 can represent different "takes" (or versions) of the same scene, each of which may differ in various ways from previous takes. In addition, there can be different views of the same scene taken from multiple cameras at different locations. Thus, a take identifier 51-2 provides information as to which take this particular image stream 51 represents.

The image type field 51-3 contains information as to the type of image stream 51, such as the type of image source from which the image originated.

The frame rate 51-4 and number of frames 51-5 indicate a frame rate at which the image stream was captured, as well as the number of frames included in the image stream 51. The frame rate 51-4 is the time interval between capturing images, typically measured in frames per second (fps). Most image streams 51 have constant frame rates 51-4, but variable frame rates are also possible.

The image frame data entries 51-7-1, 51-7-2, . . . , 51-7-$n$ contain the source pixel data comprising each image frame in the image stream object 51. The pixel maps within the image stream object 51 can be represented in any convenient form. For example, one manner of representation of a pixel map is to order the pixels based on the (X,Y) coordinates of each pixel, together with intensity (or color) information. The pixel map data may also be encoded in an efficient format such as run-length encoding. A description of a bounding rectangle, e.g., the coordinates of a rectangle beyond which the region does not extend, may also be included.

Pose information 51-8 records information relating to the position, orientation and other related parameters of the camera or other image capturing device for each frame 51-7.

Image-based object 50 representations of the scene can also include various types of derived images that result from image processing analysis 42 of original source image streams 39 (with or without intervention by a human operator).

For example, a filtered image stream object 52, including an image stream identification 52-1, can be used to represent an image stream in which "noise" (such as sampling errors) have been removed.

Another common type of image filtering, called a multi-scale resolution pyramid filtering, applies multiple passes of image filtering to construct a filtered image stream 52 as an image pyramid or a series of images 52-2-1, 52-2-2, . . . , 52-2-n, from a single captured image 52-1 wherein each pyramid level is at different levels of image detail.

A feature object 53 can be used to categorize a region of pixels as a feature of the image. Segmented feature objects 53 result from a feature extraction process that attempts to find small regions of pixels or individual pixels where there is a significant enough change in the image to characterize them as image features.

A feature object 53 in the image-based model 50 may therefore contain the output of a feature extraction analysis 42 running on an input image stream object 51. The feature object 53 typically contains an image stream record 53-1 and image frame record 53-2 identifying the particular image stream and frame to which it pertains. Also included are a bounding rectangle 53-3 containing the coordinates of a rectangle which is the boundary of the feature. A pixel map 53-4 locates (or contains) the source pixel data corresponding to the feature.

Feature tracking may also be used to operate on a series of images of the same scene. The "correspondence" algorithms in feature tracking determine if a feature as extracted from a first image corresponds to a similar feature in a second image, and typically rely on an internal model of the expected differences between successive images in order to assess if the feature is "the same."

For example, a path model object 54 may be derived from an image stream 52 that contains a model for the motion of a particular feature object 53. The path model object 54 therefore contains an image stream identifier 54-1 and a list of feature objects 54-2-1, . . . , 54-2-k, which are the feature as tracked across multiple frames.

Pattern matching (or pattern recognition) algorithms determine if a region of pixels in one frame of an image stream 51 should be classified as "the same" as some target pattern (or image region). A pattern match image-based object 55 typically lists matched features 55-1, 55-2.

Image segmentation is the process of separating an image stream 39 into meaningful image regions. A segmented object 56 contains an image stream identifier 56-1, a frame identifier 56-2, and a segment definition 56-3. These segmented image regions may, or may not, exactly correspond to individual physical objects derived as features of the scene. For example, features that "overlap" one another from the perspective of a camera 35 might be incorrectly segmented as a single image region. In another instance, the images of a single physical object might be incorrectly (or inconveniently) segmented into multiple image regions.

Image tracking applies image segmentation 56 across a sequence of related images (e.g., the individual frames of a film or video clip) by "following" a segmented image region in each successive frame. Image warping algorithms, combined with pattern matching algorithms, can help estimate the relationship (or "correspondence") between segmented image regions across multiple captured images. Image warping applies a 2D transform which linearly or non-linearly maps the coordinate system of a pixel region into a different coordinate system.

An image tracking object represents these results as an image stream identifier 57-1, and a segment list 57-2-1, . . . , 57-2-1.

A common application of optical flow analysis is to divide an image into an array of tiled image regions, and then attempt to match all of the image regions in one image against their corresponding image regions in the other image. The result is a set of vectors that represent relative motion of image regions from one image to the next. These, in turn, can be interpreted as some combination of movement of objects in the scene and movement of the camera (or other image sensor). Some algorithms based on optical flow attempt to distinguish between object and camera movement, by attributing the dominant motion (the motion that applies to most tiled regions) to the camera 35, and then resolving the motion of objects after correcting for camera motion (using image stabilization techniques). If the movement of an object actually dominates the image, this estimation may be incorrect.

An image file object records these estimates as an image stream identifier 58-1, and segment/motion vector pairs 58-2-1, 58-3-1, . . . 58-2-m, 58-3-m.

Some machine vision algorithms also require implicit or explicit assumptions about the camera 35 (or other image sensor) used to capture the image stream. These camera parameters may include camera location in the physical scene, camera resolution (number of pixel samples in both the horizontal and vertical dimensions of the camera's imaging plane), camera motion, focal length, pan, zoom, optical center, radial distortion, CCD distortion, and other lens and filter characteristics. Some machine vision algorithms include a camera calibration phase that attempts to estimate and recover a subset of these camera parameters by analyzing multiple captured images of the same scene or by measuring known objects against a reference image. Other camera parameter extraction algorithms may simply accept camera parameters as inputs to the system 10 or from secondary sensors 38 (such as laser range-finders and motion sensors). Furthermore, techniques such as stereo or multi-camera imaging can further provide information about the physical scene.

Annotations can also be applied to the image-based objects 50 at multiple levels—on an entire image stream 51, such as at data entry 51-8, on image features in the stream, such as entry 53-5, or on selected pixel regions (or individual pixels or sub-pixels) as tracked in the images, such as entry 54-3.

At the image stream and image feature levels, the annotations can supply a link to the correlation mesh 80 for general parameters of the scene model 40, such as sensor data 51-6, including camera position and movement, camera parameters, and lighting parameters. At the pixel region level, the annotations 52-5 can supply a link to the correlation mesh 80 for specific structural attributes or features of the scene model 40 as will be described below.

Returning attention now to FIG. 2 briefly, the results from running image analysis 42 are therefore typically used to construct image-based model objects 50 of the scene. However, the invention also makes use of abstraction-based model objects 60 representing the scene as well.

In an abstraction-based model object 60, the physical objects in a scene may be mathematically modeled by the user specifying inputs that describe geometric and/or volumetric structures that have attributes such as size, position, color, and surface textures. Motion or other dynamics of the abstraction-based objects 60 can also be modeled through mathematical or other deterministic specifications by the user, such as translations, rotations, and deformations to be applied to the abstract objects 60. Cameras, sensors, and lighting objects in the scene may also be modeled as abstract objects 60 with their own attributes as specified by the user.

However, the analysis algorithms 42 may also be used to produce abstraction-based objects 60. These algorithms 42 are invariably based upon statistical estimations of the features and characteristics of the input image(s) 39, and rely on various heuristics to categorize these into abstract models of a physical scene. A number of known techniques for inferring abstract scene information from captured image data can differentiate, classify, identify, and/or categorize the physical objects in a scene, as well as provide estimates of the geometric (or volumetric) structures of such objects, their physical attributes, their locations in the scene, and their motions over time. These techniques can also be used to estimate the location, motion, and various other parameters of the camera objects 75 (imaging sensors) and light objects 74 in the scene model 40 as well.

More particularly now, an abstraction-based object 61, or simply abstract object 61, contains a description of the scene in terms of geometric or volumetric parameters as shown in FIG. 5. For example, in a geometric type of abstraction-based object 60, a geometric data entry 61-1 includes a set of equations for surfaces, planes, or curves, in three dimensions. A volumetric model may also be used which describes the object in terms of "voxels," for example, as an entry 61-2 that includes a set of three dimensional unit cubes.

Each abstraction-based object 61 also contains information needed to render a desired visual representation of the object. For example, data entries may be included to specify shading 61-3, texturing 61-4, element size 61-5, and/or level-of-detail 61-6. Shading 61-3 and texturing 61-4 data are used in a post-processing stage to render the object in a desired way; element size 61-5 and level of detail 61-6 entries specify a desired resolution for this rendering. Level-of-detail 61-6 supports different renderings of the same object with different levels of precision, depending on factors such as the rendering technique being used and the distance of the object from the rendering "camera." As in the case of an image-based object 51-0, annotation entries 61-8 are also included in the abstraction-based object 61.

The geometric or volumetric structure of an abstract object 61 can also include data 61-7 classifying the object as either a rigid or amorphous body.

Proxy objects 62 are three-dimensional objects to be correlated with, and eventually replaced by, either an image stream 51 (as isolated from a digitized film/video clip or rendered animation) or another three-dimensional abstract object 61. There can be multiple levels of proxy objects 62 for the same input object, maintained by the system as a proxy set. This gives the user access to different versions of the object, to accommodate object and data exchange with other applications, and to permit interactive scene model development as described below.

The abstraction-based model objects 60 can be used in various ways. For example, spatial and structural attributes of a scene can first be derived, in whole or in part, from image-based 50 and/or sensor-based estimations of scene structure, geometry, depths, motions, camera parameters, and lighting, as described above. These derived attributes can then be used to construct a set of abstraction-based objects 61 representing the scene.

Alternatively, user-specified "a priori" abstraction-based objects 60 can be used to provide an analytical, predictive framework to guide and drive image-based and/or sensor-based machine vision analysis techniques 42. An "a priori" abstraction-based object 60 can greatly improve the accuracy and efficiency of analysis algorithms 42 by helping to resolve ambiguities, refine estimations, and correct errors in the image or sensor data.

As a result of having both an image-based 50 and abstraction-based 60 model of a given object in a scene 70, production of synthetic segments that emerge from a world of computer graphics and animation can therefore be more easily coordinated with real-world image streams 39. Indeed, it is sometimes required that the same object be manipulated in both media and synthetic form, since what is typically hard to create with one is typically easier in the other. For example, in a production like the movie "Independence Day," both a physical model and a computer model are typically made of an object such as a spaceship. Depending upon which effect is desired in a particular scene, recorded images of the physical model may be first stored as image-based objects 50. Computer-generated synthetic segments may also be derived and stored as an abstraction-based objects 60. For example, when a spaceship is to be shown traveling rapidly through a scene, a synthetic abstraction-based object 61 may be used. As the spaceship slows down, a switch may be made to the recorded media segment, such as taken by a motion controlled camera shot of the spaceship model, as stored in one of the image-based objects 51.

In order to permit realistic renditions from all possible types of objects in the scene model 40, a number of other objects 70 are also included as shown in FIG. 6. For example, lighting 74, camera 75, and viewing 76 objects have a current position specified as an (X,Y,Z) location relative to the scene model's spatial reference model 71.

Camera objects, viewing objects, and directional lighting objects also have a direction vector 74-2, 75-2, 76-2, specified as a vector with its origin at the object's current position 74-1, 75-1, 76-1. For example, a camera object's 75 field of view 75-3 may be modeled as a pyramid or frustum, while a directional light object's 74 umbra and penumbra may be modeled as either a cone or conic section. Viewing objects 76 model the viewpoint of an observer of the scene. They are used to provide information to the user about the three-dimensional characteristics of the scene, such as through a scene viewer 44 (FIG. 2) to allow the user to "move around" the three-dimensional scene model 70 as needed. A viewing object 76 can either have a perspective view or orthogonal view of the scene model 70.

Lighting objects 74 also typically have both a color 74-3 and strength 74-4. The color 74-3 is specified as either a color temperature (degrees Kelvin), or in terms of a color space, such as or red-green-blue (RGB) values. The strength 74-4 can be specified in lumens, with the light's brightness at a point in the set, calculated, for example, using an inverse square law calculation.

Camera objects 75 may also include other attributes of the associated camera, including focal length 75-4, optical center 75-5, vertical resolution 75-6, horizontal resolution 75-7, radial distortion 75-8, and CCD array distortion 75-9 provided by direct measurement or image analysis, as previously described.

Operations and transformations on objects 50 and 60 can also be specified as other objects. For example, a path model object 77 such as shown in FIG. 6 may define the motion of an image-based 50 or abstraction-based object 60 in space and time. Various types of path models are supported, including geometric paths 77-2-1, pixel region paths 77-2-3, physical paths 77-2-2, and camera motion paths 77-2-4.

Geometric paths 77-2-1 are based on two-dimensional/ or three-dimensional geometry, and are the types of paths usually found in traditional animation systems for abstract objects 60.

A geometric path model 77-2-1 typically consists of a motion path and velocity path. The motion path is either a two- or three-dimensional curve defined in the coordinate space. The velocity path is a two-dimensional curve that defines the object's velocity over time as it follows the motion path, and is typically used to model the effects of gravity, or to "ease in" and "ease out" an object's motion to simulate inertia and give the appearance of more natural motion. Geometric path models 77-2-1 can also be defined parametrically or as a set of control points interpolated by a curve.

Physical paths 77-2-2 are based on a physical model of the set, of objects on the set, their interactions with each other, and/or the effects of external forces like gravity.

Pixel region paths 77-2-3 are typically derived from an analysis of successive frames in an image stream. Pixel region paths 77-2-3 are taken from two-dimensional paths on an image plane that models the motion of a specified pixel region in an image stream 39. These are typically expressed as 2D motion vectors applied to the centroids of their respective pixel regions.

Camera motion path models 77-2-4 can be derived from visual analysis 42 of image streams 39 and/or specified within an abstraction-based model of a scene. In an image-based approach, the camera path can be estimated from the dominant motion in the image plane combined with residual parallax information after compensating for the dominant motion. Alternatively, pixel regions in the camera's image plane can be selected, tracked, and then associated with fixed objects or surfaces in the set model. The changes in these pixel regions are used to derive one or more potential three-dimensional camera motion paths relative to the set model. If there is more than one potential path, then the user selects the best fit. This motion path is interpreted as a three-dimensional geometric path using interpolated control points.

Scene dynamics such as path models 77 can be estimated or derived from image-based analysis 42 of visual streams 39, and then represented by abstract operations such as applying a motion path object 77 to an abstract object 60.

An acoustic model 78 stores data concerning the acoustic properties of other objects in the scene model 40, such as their acoustic absorption 78-1 and reflection 78-2 characteristics.

Returning attention briefly to FIG. 2, the correlation mesh 80 serves in its simplest form to store links between an image-based object 50 and an abstraction-based object 60 of a given physical object in the scene. The correlation mesh 80 thus provides an easy way to switch between the two different possible renditions of the physical object.

The correlation mesh 80 can also maintain multiple links between various object representations 50 and 60, and to iteratively examine and refine each such representation, resulting in a composite unified scene model 40 that has the advantages of both model types.

As a result, a number of processes can be used according to the invention to create a comprehensive scene model 40 which converges deterministically to provide as realistic a representation of the scene as possible. As will be described below, image-based analysis 42 of scene dynamics can be progressively improved by using the image-based objects 50 in the scene model 40 as a predictive analytical tool. This is particularly the case if user intervention through the scene viewer 44 and user interface 46 is part of an adaptive feedback loop. Likewise, the choice of abstract objects 60 and their parameters in the scene model 40 can be progressively improved by using the estimates derived from image-based analysis techniques 42, particularly if combined with user intervention.

There are three distinct methods to construct an initial scene model 40. The first method derives both the initial scene model 40 and an initial set of image-based objects 50 therein from image-based analysis 42 of the visual image stream(s), using one of the techniques described above. The second method uses an initial scene model 40 composed of abstraction-based objects 60 as generated by a computer modeling application such as a computer-aided design (CAD), computer graphics, or computer animation system. The third method generates an initial scene model 40 containing either image-based 50 and/or abstraction-based 60 models from direct input by the user (human operator), with or without reference to the input image streams 39.

Continuing to pay attention briefly to FIG. 2, in the first method, analysis techniques 42 based strictly on the input image stream data 39 can derive an initial scene model 40 containing abstract objects 60 that estimate the relative "depths" and positions of pixels or pixel regions in the object-space 41-1 or 41-2. This process may typically also include estimating camera parameters to provide depth estimates, such as computed from image parallax between multiple images of the same scene, either successive images from the same camera or images from two or more cameras. Data from other sensors, such as laser range-finders, can also be used in depth estimation.

In analysis techniques 42 based on feature extraction and tracking, pixel regions are extracted and tracked as image features 53, pixel region paths 54 or other image-based objects 50. These are then projected back from the original 2D image-space into the defined 3D object-space 41-1 or 41-2 based on estimates of camera parameters, using assumptions about the relative orientation of the image features and how they were originally projected from the scene coordinate system.

Alternatively, using techniques based on optical flow, a depth matte of the image can be made which estimates the depth range of each pixel or pixel region in image-space from the camera's viewpoint. The depth matte is a geometric surface abstract object 60 that describes the estimated surface contours of objects in the scene. This geometric surface is then projected from a coordinate system based on the camera's viewpoint to the scene coordinate system, using estimates of camera parameters and other related assumptions.

In the second method of deriving an initial scene model, the user may typically specify abstraction-based objects 60 for the scene model 40. However, the benefits of a pre-defined scene model 40 containing strictly abstract objects 60 are negated if this model is itself inaccurate, or not resilient to dynamic changes in the scene, since each abstraction-based object 60 is, by its very nature, a simplification of the actual scene. It will therefore have inherent inaccuracies when compared to the actual physical object. In addition, the scene model 40 at this point may have been created with incorrect data about the scene, or the scene may have changed after the model was built.

There can also be various errors in the estimated geometric and surface properties of the image-based objects 50 inferred from image-based analysis 42. For example, when the view of a physical object is occluded in an input, visual stream, extracted image-based features 50 may not exactly correspond with abstraction-based features 60 and segmented objects 56 may not correspond with actual objects in the scene. The analyzed surfaces of multiple physical (or synthetic) objects may end up being "blended" into a single image-based object 50. In models derived from image-based techniques alone, there is no way to determine "back-facing" surfaces and/or entire physical objects that are hidden or partially hidden from the camera's view.

The invention corrects these errors and inaccuracies, while providing more meaningful segmentations of the scene. This, in turn, can be fed back to the image-based analysis techniques 42 to progressively increase the quantity and quality of information derived from these techniques. By allowing user intervention within this iterative process, it becomes possible to adaptively control both the analysis 42 and object modeling processes 50 and 60. This allows progressively better convergence between the image-based 50 and abstraction-based 60 representations in the scene model 40.

In particular, as the abstraction-based objects 60 of the scene are created and refined, the corresponding image-based objects 50 are also analyzed and annotated with information about the physical (or synthetic) scene that they represent. These annotations provide the basis for links to converge between the abstraction-based 60 and image-based 50 representations. The linkages between these two models are organized as a separately accessible "correlation mesh" 80. The process of converging between the abstraction-based 60 and image-based 50 representations is implemented by increasing the density and accuracy of linkages in the correlation mesh 80, and additions, corrections, deletions, and other modifications to the image-based objects 50 and abstraction-based objects 60.

These linkages in the correlation mesh 80 can be generated through presentation of the scene model 40 through the scene viewer 44, and prompting the user for feedback through the user interface 46. Alternatively, the correlation mesh 80 can be automatically annotated, in a manner described herein.

Annotation entries in both types of objects 50 and 60 provide the linkages to the correlation mesh 80. For example, annotations 51-8 can be made on an entire image stream object 51, on one or more individual image-frame(s) in the stream, or on specific pixel regions (or individual pixels) of one or more image-frame(s) in an image stream object 51. Annotations at the stream level can have linkages in the correlation mesh 80 to general properties of the corresponding abstraction-based model 60. This can include, for example, a linkage to a camera object 75 which represents the camera that captured (or rendered) the image stream object 51. Linkages at the stream level can also connect an image stream object 51 with other related streams 51, such as different takes of the same scene or different views from multiple cameras.

At an image-frame level, annotations 51-8 can supply information about the dynamics in the image. This might include the relative timing of when the image was captured (or rendered), and various camera parameters related to that image (e.g., camera focal length, camera location). These annotations 51-8 can be linked through the correlation mesh 80 to corresponding time-based parameters of the scene model 40, and/or to other corresponding images in related image streams 51.

At the pixel region (or individual pixel or sub-pixel) level, annotations 51-8 can be made to highlight specific features or characteristics of the image. The correlation mesh 80 can link these annotated features to specific objects, to a group of objects, or to specific features of the abstraction-based objects 60. This also allows correlation of image-based feature objects 52, as represented by pixel regions, with abstract object features 60 in the scene model 40.

The correlation mesh 80 also supports the tracking of image feature objects 52 across multiple image-based objects 50. This tracking be done on successive images from the same image stream 39, or from different but related streams 39. If these image feature objects 52 are also linked to a common feature in an abstract-based object 60, different image representations of the same feature can be located through the linkages in the correlation mesh 80.

The ability to add annotations that create linkages in the correlation mesh 80 is central to the adaptive process of converging the image-based 50 and abstraction-based 60 object representations of the scene. By allowing the user to guide and control the convergence process, the result is higher quality analysis of the input image streams 39, better annotations of these streams, a more detailed and realistic scene model 40, and a denser and more complete set of linkages in the correlation mesh 80. These annotations, models, and linkages can then be used for further image-based analysis 42 and abstraction-based modeling 60 of the scene. As this adaptive process continues, more accurate and useful information is successively obtained about the scene and its dynamics.

Furthermore, the user can improve the efficiency of the entire process by continuously determining which aspects of the scene are important, and which types of refinements are needed on successive iterations.

Figure 7:
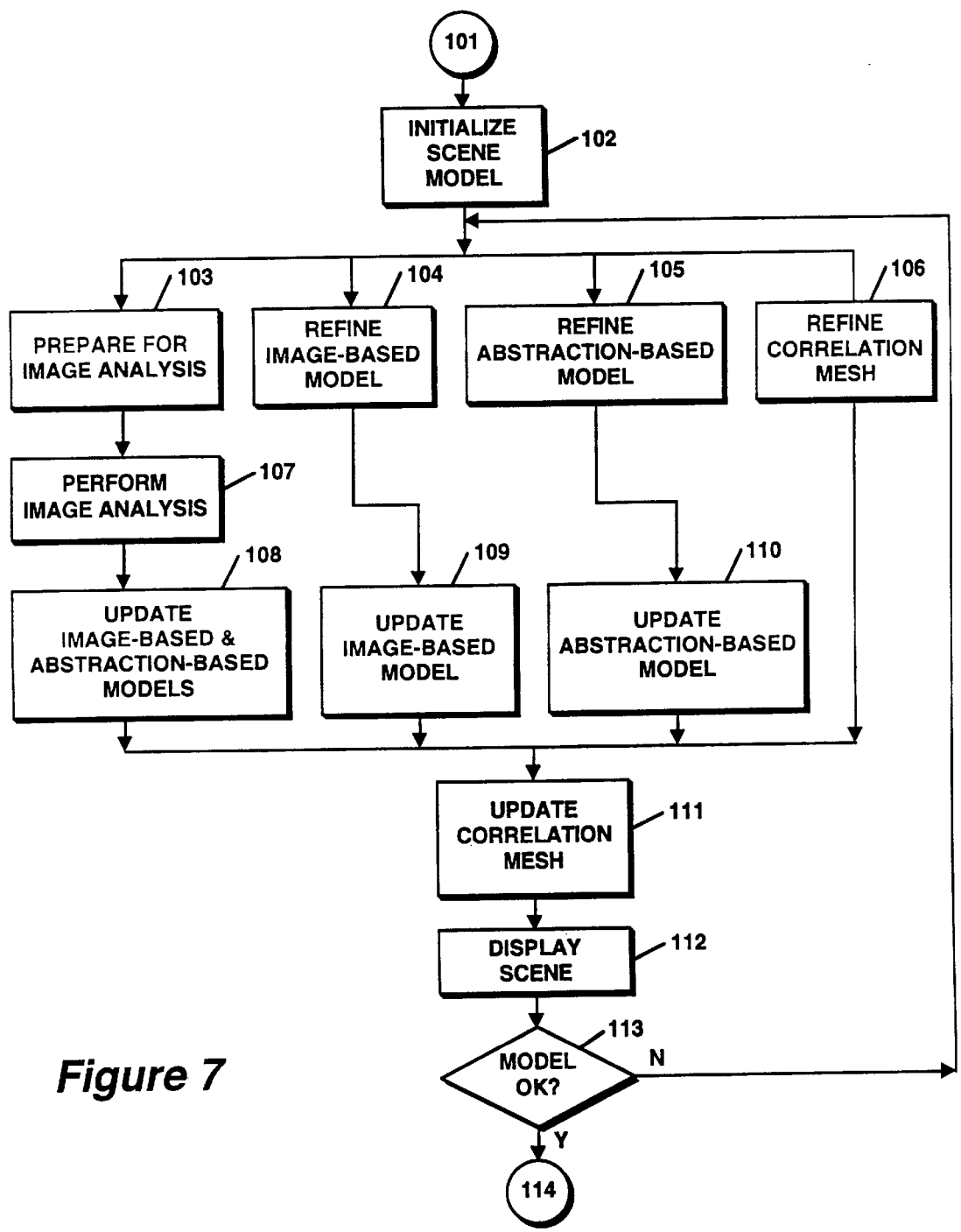
FIG. 7 is a flow chart of the operations performed by the invention to arrive at a scene model.

FIG. 7 is a flow chart of one possible series of operations performed by the system 10 to iteratively refine the scene model 40.

The process begins from an initial state 101 proceeding to state 102 in which the scene model 40 and its constituent components are initialized. This includes creating an initial version of an abstraction-based model 60, image-based model 50 and correlation mesh 80. The initial abstraction-based model 60 may contain certain assumptions such as the parameters for the spatial reference 41. If one or more aspects of the scene model 40 have already been initialized, then these initialization functions can be skipped.

From state 102, the process proceeds to an iterative loop. There are four different paths through this loop, represented by state 103, state 104, state 105 and state 106. At each iteration of the loop, the choice of which path to take can be made automatically or with input from a human operator. It is also possible to execute two or more of these paths in parallel.

State 103 and successive states 107 and 108 perform an automated image analysis function with optional control from a human operator. This begins with state 103, which prepares for image analysis by selecting the image-based objects to be used in the analysis. This selection process can include "masking out" those regions and/or frames not relevant to this iteration of the analysis. This masking process can prevent the inclusion of regions and/or frames that had previously caused an analysis algorithm to produce ambiguous or incorrect results. State 103 can be done through an automated process or under the control of a human operator.

At state 103, various parameters for the image analysis function can also be determined. This can include the choice of which image analysis algorithm(s) to use, the sequencing of these algorithms, and how to use the output(s) of one algorithm as input(s) to another.

State 103 is followed by state 107, in which the image analysis is performed. Image analysis may include any of the aforementioned processes for analyzing an image frame or image sequence. In state 108, the results of this analysis are applied to updating the image-based model 50 and the abstraction-based model 60. This is followed by state 111, which applies the analysis results, along with any changes made in state 108, to update the correlation mesh 80.

State 104, followed by state 109, allows the human operator to refine the image-based model 50. This includes adding, changing and deleting any object or group of objects in the image-based model. In state 104, a human operator can provide the input to make these refinements to the image-based model. In state 109, these refinements are applied and the image-based object model is updated. This is followed by state 111, in which the results of state 109 are used to update the correlation mesh 80.

State 105, followed by state 110, allows the human operator to refine the abstraction-based model 60. This includes adding, changing and deleting any object or group of objects in the abstraction-based model. In state 105, a human operator can provide the input to make these refinements to the abstraction-based model. In state 110, these refinements are applied and the abstraction-based object model is updated. This is followed by state 111, in which the results of state 110 are used to update the correlation mesh 80.

State 106 allows a human operator to refine the correlation mesh 80. This includes adding, changing and/or deleting any linkage or other property of the correlation mesh. This is, in turn, followed by state 111, in which these refinements are applied and the correlation mesh is updated.

As previously discussed, state 111 updates the correlation mesh 80 based on the results of either or all of states 106, 108, 109 and 110. This is followed by state 112, in which one or more aspects of the scene model 40 are displayed for review by a human operator. In state 112, a human operator can control which aspects of the scene model 40 are displayed, and the manner in which they are displayed. Based on this, in state 113 a human operator can determine if the scene model 40 is sufficient for the intended purposes at that time. If so, the process proceeds to state 114 and ends. If not, the process returns to the iteration loop, which can be performed as many times as needed.

FIG. 8 shows an example of how this process can be used to refine the image-based model 50 and abstraction-based model 60 using the correlation mesh 80. In the example shown by the picture, the scene is one of a soccer ball 150 bouncing off the top of a table 152. The scene also contains a picture 154 hanging on a wall of the room in which the table is located.

In this example, a first pass of an image segmentation process has operated on a first image frame 51-7-1 of an image stream 51. The result of this process has defined a first entry F1 containing an image-based object 50, namely REGION__1, containing a segmented object 53 that has a pixel map that corresponds to the tabletop 156 in the image. A second image-based object 50 is also defined. It is named REGION__2 and contains a segmented object 53 that has a pixel map associated with a second region in the scene, namely the picture 154 hanging on the wall. A final image-based object 50 named REGION__3 contains a segmented object 53 for the pixels that represent the soccer ball 150 in the frame 51-7-1.

Initial objects for the abstraction-based model 60 are then also created. In this instance, user inputs have resulted in two abstraction-based objects 60 being defined, namely OBJECT__1 and OBJECT__2.

Appropriate data have been added to the abstraction-based objects 60 to indicate each object type. For example, OBJECT__1 is defined as a volumetric sphere, to represent the soccer ball 150, and OBJECT__2 as a planar surface, to represent the tabletop 152.

Alternatively, the abstraction-based object model 60 could be created from results of image analysis 42 processes. For example, a pattern matching process may have determined that the object in REGION__3 of the frame is a circular region and assigned a position, size, color, and other attributes to the OBJECT__1 entry in the abstraction-based model 60. Similarly, another pattern matching process may have determined that REGION__1 is a planar object and has similarly provided position, size, and texture information for the table top in the OBJECT__2 definition. Camera 156 and lighting 158 objects are also added to the model 40, as a CAMERA__1 and LIGHT__1 object, respectively.

A detailed model is typically only created for each physical object in the scene of interest to the user. The remaining physical objects are either modeled incompletely or not at all. For example, the user may be principally concerned in this series of images with replacement of the actual soccer ball 150 with the synthetic computer-generated rendition of the soccer ball, and at the same time controlling the way in which the soccer ball 150 bounces off the table 154 in order to produce special effects, such as with a shower of sparks at the time the ball 150 hits the table 152. The user has thus decided that certain objects in the scene, such as the picture 154 hanging on the wall, are not important to the special effects, and therefore whatever models, if any, of these objects will not be used.

At this point, the user may compare the image-based model 50 and abstraction-based model 60 and in an attempt to refine the definition of the scene 40. In particular, the user may recognize that the pixel map associated with REGION__1 is the same as the object defined as OBJECT__2. Therefore, the user creates an entry in the correlation mesh 80 indicating that these two elements should be linked together. Similarly, a link is made between REGION__3 and OBJECT__1 to associate the pixel map of the soccer ball 150 in the image-based model 50 with the sphere in the abstraction-based model 60. A link can also be established between the REGION__1, OBJECT__2 and CAMERA__1 objects. This defines a projective transformation between the image plane for REGION__1 and the spatial reference model 41 for OBJECT__2. A similar link can be established between CAMERA__1, REGION__3 and OBJECT__1.

The second pass may analyze subsequent frames 51-7-2, 51-7-3, . . . , 51-7-4 of the image stream object 51. This, in turn, creates entries F2, F3, F4 of the same nature as entry F1 in the image-based model 50.

The second pass typically defines additional detail for the pixel regions in the images. In this instance, a REGION__5 and REGION__6 have been extracted from the images, and recognized as the front legs of the table 152, with annotations being added to the abstract model 60 to redefine OBJECT_2 as including four "leg" objects. An appropriate entry is then made in the correlation mesh 80 to record the association between the REGION_5 and REGION_6 and LEG_1 and LEG_2 of the table object, respectively.

Other objects such as path model objects 63 may also be associated in the scene model 40. For example, as a result of an image tracking process, the image-based model 50 may have data in the form of a feature path model object 54 in which a particular feature, such as the pixel map associated with REGION_3, is located in each of the frames in the image stream object 51. At this point, the image-based model merely records the fact these features are somehow related to one another.

Meanwhile, in the abstraction-based model 60, the user may define another abstraction-based object OBJECT_3 as a path model object 77 for the soccer ball 150 in terms of the object space 41-1.

At the same time, linkages are added to the correlation mesh 80 to attach the abstraction-based path model in OBJECT_3 to the TRACK_1 object of the image-based model 50.

While the above example illustrates how the abstraction-based model 60 may refine the image-based model 50, the image-based model 50 may also refine the abstraction-based model 60. For example, it may be the fact that the soccer ball 150 is actually accelerating in the image stream object 51, whereas the abstraction-based path model in OBJECT_3 assumes that the ball 150 has simply been dropped from a particular height. Certain analysis techniques can determine the actual acceleration of the ball from frame-to-frame, such as by feature-tracking the ball as defined in REGION_1 and calculating the path and velocity of the centroid of the 2D pixel map. The output from the featured tracking process may be entered into the scene model 40 directly by the image-based process as OBJECT_4. An appropriate annotation is then made in the correlation mesh to associate the calculated path model in OBJECT_3 with the image-derived path model in OBJECT_4. In this manner, the abstraction-based model object 60 can be refined through further iterations of the corresponding image-based model object 50.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of (ii) defining an abstraction-based data object in an abstraction-based model of the visual objects containing an abstract representation of at least a portion of one of the visual objects represented by the visual image sequence; and (iii) storing a link data object in a correlation mesh data structure indicating a correspondence between the image-based data object and the abstraction-based data object;

(b) refining an abstraction-based model of the visual imago sequence by performing the steps of:

(i) accepting input parameters to define in the abstraction-based model of the visual objects a new abstraction-based data object containing a new abstract representation of at least a portion of one of the visual objects contained in the visual image sequence that differs from the abstract representations contained in abstraction-based objects defined in the analysis step (a); and (ii) adding a link object in the correlation mesh data structure indicating a correspondence between the new abstraction-based data object and another data object defined in the scene model; and (c) iteratively improving the scene model by performing certain selected ones of steps (a) through (b) in an order as specified by user input until a desired level of refinement is obtained in the scene model such that selected link objects in the correlation mesh data structure added in iterations of the refining step (b) are used to provide additional input parameters to subsequent iterations thereby allowing the scene model to converge.

2. A method as in claim 1 wherein the abstraction-based objects comprise motion path models of the motion of a visual object from frame to frame.

3. A method as in claim 1 wherein the abstraction-based objects comprise camera motion path models of the motion of a camera from frame to frame.

4. A method as in claim 1 wherein the scene model is developed from a plurality of visual image sequences and certain links in the correlation mesh indicate correspondences between data objects representative of a given visual object as derived from different visual image sequences.

5. A method as in claim 1 wherein the visual object in the input visual image comprises a physical object.

6. A method as in claim 1 wherein the visual object in the input visual image comprises a synthetic object.

7. A method as in claim 1 wherein the step of defining an abstraction-based model additionally comprises the step of accepting user input to direct the operation of the machine vision process.

8. A method as in claim 1 wherein the step of defining an image-based data object comprises the step of operating a machine vision process.

accepting user input to define a link between data objects in the scene model.

13. A method as in claim 1 additionally comprising the step of:
accessing a data object in the scene model by reference through the correlation mesh to another data object in the scene model.

14. A method as in claim 1 additionally comprising the step of:
accessing an image-based data object by reference to another data object in the scene model through a corresponding link in the correlation mesh.

15. A method as in claim 14 wherein at least one other data object is an abstract model data object.

16. A method as in claim 1 additionally comprising the step of:
accessing an abstraction-based data object by reference to another data object in the scene model through the corresponding link in the correlation mesh.

17. A method as in claim 16 wherein the other data object is a pixel representation data object.

18. A method as in claim 1 additionally comprising the step of:
storing a camera model data object in the scene model wherein the camera model data object defines at least one parameter of a camera that was used to generate the visual image sequence.

19. A method as in claim 18 wherein the camera model data object defines at least one camera parameter taken from the group consisting of camera position, camera movement, camera resolution, camera field of view, and camera orientation.

20. A method as in claim 1 wherein the visual image frames are stored as image-based data objects in the scene model.

21. A method as in claim 1 additionally comprising the step of:
storing a light model data object in the scene model wherein the light model data object defines at least one parameter of a light that was used to generate the visual image sequence.

22. A method as in claim 21 wherein the light model defines at least one light parameter taken from the group consisting of light position, light movement, light intensity, light color, and light orientation.

23. A method as in claim 1 additionally comprising the step of:
storing an acoustic model data object in the scene model wherein the acoustic model data object defines at least one parameter of an acoustic attribute of the scene model.

24. A method as in claim 1 wherein the step of refining an image-based model additionally comprises the steps of:
creating multiple pixel representation versions of a given visual image frame, the multiple pixel representation versions being at different levels of image resolution; and
using different ones of the pixel representation versions in given iterations.

25. A method as in claim 24 additionally comprising the step of:
presenting an interactive display of intermediate results of storing the scene model from a given iteration whereby a user specifies which one of the pixel representation versions is to be used in a subsequent iteration.

26. A method as in claim 24 wherein the different levels of image resolution are for different spatial resolutions.

27. A method as in claim 24 wherein the different levels of image resolution are for different color space resolutions.

28. A method as in claim 1 wherein the step of refining an abstraction-based model additionally comprises the steps of:
creating multiple abstraction-based model versions of visual object, the abstraction-based model versions being at different levels of modeling detail; and
using different ones of the abstraction-based model versions in given iterations.

29. A method as in claim 28 additionally comprising the step of:
presenting an interactive display of an intermediate scene model from a given iteration whereby a user specifies which one of the abstraction-based model versions is to be used in a subsequent iteration.

30. A method as in claim 28 wherein the different levels of modeling detail are different levels of geometry detail.

31. A method as in claim 28 wherein the different levels of modeling detail are different representations of surface textures.

32. A method for developing a computerized scene model from a digital image, the method comprising the steps of:
(a) running an automated image analysis algorithm according to input parameters to provide image analysis results data;
(b) storing portion of the image analysis results data as an image-based data object in the scene model;
(c) storing other portions of the image analysis results data as an abstraction-based data object in the scene model;
(d) annotating a correlation mesh data object in the scene model with data indicating a link between the image-based data object and the abstraction-based data object;
(e) refining the scene model by accepting input parameters concerning at least one new abstract representation of the digital image, the new abstract object containing an abstract representation differing from the abstraction-based object stored in step (c);
(f) annotating a correlation mesh data object in the scene model with data indicating a link between the new abstraction-based data object and other data objects in the scene model; and
(g) iterating selected ones of steps (a) through (f) in response to user input until a desired level of refinement is obtained in the scene model such that selected link objects in the correlation mesh data structure added in iterations of the refining step (e) are used to provide additional input parameters to subsequent iterations, thereby allowing the scene model to converge.

33. A method as in claim 32 wherein the image processing algorithm is selected from the group consisting of feature tracking, image segmentation, and optical flow.

34. A method as in claim 32 wherein the abstract representations include geometric models.

35. A method as in claim 32 wherein the abstract representations include volumetric models.

36. A method as in claim 32 additionally comprising the step of:
specifying a spatial reference model defining a three-dimensional stage coordinate system in the scene model.

37. A method as in claim 36 wherein a projective transformation between the image plane of an image-based data object and the coordinate system of the abstraction-based data object is defined with respect to the spatial reference model.

38. A method as in claim 32 wherein the step of accepting input data concerning abstract representations accepts input data from a human user.

39. A method as in claim 32 wherein the step of accepting input data concerning abstract representations accepts input data from an image processing algorithm.

40. A method as in claim 32 additionally comprising the step of, before step (f), displaying a visual representation rendered from the scene model.

41. A method as in claim 1 additionally comprising the step of:
(d) refining an image-based model of the visual image sequence by performing the step Of:
  (i) accepting input parameters to define in the image-based model a new imago-based data object containing a pixel representation corresponding to a portion of at least one frame of the visual image sequence.

42. A method as in claim 41 wherein step (d) additionally comprises the step of:
  (ii) adding a link object in the correlation mesh data structure to indicate a correspondence between the new image-based data object and another data object in the scene model; and
  wherein step (c) additionally comprises the step of performing certain selected ones of steps (a), (b), and (d) in an order as specified by user input such that selected link objects in the correlation mesh added in iterations of refining step (d) are also used as additional input parameters to subsequent iterations.

43. A method as in claim 1 in which an additional refining step accepts input parameters which modify or delete a link object in the correlation mesh data structure.

* * * * *

UNITED STATES PATENT AND TRADEMARK OFFICE
CERTIFICATE OF CORRECTION

PATENT NO. : 6,124,864
DATED : September 26, 2000
INVENTOR(S) : Paul B. Madden, Philip R. Moorby, John S. Robotham and Jean-Pierre Schott It is certified that error appears in the above-identified patent and that said Letters Patent is hereby corrected as shown below:

In Claim 1, column 20, line 11, change "imago" to --image--
In Claim 41, column 23, line 15, change "imago" to --image--

Signed and Sealed this

Seventeenth Day of April, 2001

*Attest:*

NICHOLAS P. GODICI

*Attesting Officer*      *Acting Director of the United States Patent and Trademark Office*